July 4, 1944.   H. CLAUSING ET AL   2,352,695
APPARATUS FOR TRANSCRIBING LAST CONTOURS
Filed June 30, 1942   2 Sheets-Sheet 1

INVENTORS
Henry Clausing
Walter Clausing

July 4, 1944. H. CLAUSING ET AL 2,352,695
APPARATUS FOR TRANSCRIBING LAST CONTOURS
Filed June 30, 1942 2 Sheets-Sheet 2

INVENTORS.
Henry Clausing
Walter Clausing
BY

UNITED STATES PATENT OFFICE 2,352,695

APPARATUS FOR TRANSCRIBING LAST CONTOURS

Henry Clausing and Walter Clausing, Portsmouth, Ohio, assignors to Vulcan Corporation, Portsmouth, Ohio Application June 30, 1942, Serial No. 449,114

9 Claims. (Cl. 33—41)

This invention relates to an apparatus for transcribing the outline of a selected cross section or other portions of the contour of a shoe last upon a chart such as a sheet of paper or light cardboard thereby to provide an accurate drawing with which the last maker may facilitate and improve the accuracy of his work.

The last maker and particularly the trained specialist who is intrusted with the job of producing last models having a high degree of accuracy frequently has occasion to use templates in testing the dimensions and contours of the last that he is producing. It so happens that in a substantial part of this work he must copy the whole or a portion of another last model which may and in many cases does present a master design from which other models may be created. To do this part of his work the last maker must be supplied with accurate templates for checking and comparing the contours of the master model, or other lasts which he may be simulating in whole or in part, with the last he is creating. The present invention supplies a device with which the last model maker may produce the necessary templates with a high degree of accuracy and with a great saving of time and labor as compared to the inefficient cut and try method in use prior to this invention.

The apparatus is provided with a base the upper face of which is finished with an accurately flat work surface upon which is placed a sheet of material upon which the last outline is drawn. A supporting column is secured to and extends upward from the base and is provided with a laterally projecting arm having a specially constructed clamp upon its outer end within which the last may be clamped in any desired position. The arm is provided with adjusting means to enable the last held in the clamp to be located at a predetermined height above the work surface and directly above that portion of the sheet or chart upon which the last contour is to be transcribed. Means are provided for rigidly clamping the arm to the column thereby rendering the last rigidly fixed with respect to the work surface.

The active transcribing element of the apparatus which will hereinafter for purposes of description be called a transcribing member is composed of a base section of considerable weight having a flat bottom which engages and moves upon the work surface. The base member is so constructed that it will be held by gravity in close engagement with and in invariable angular relation to the work surface. A column or post extends upward vertically from the base of the transcribing member and has secured thereto adjacent its upper end a horizontally extending arm having a follower point at its other end. Directly beneath the tip of the follower point is situated a scribing point which engages the paper sheet or chart. The point at which the scribing means engages the chart and the point of the follower must be in exact perpendicular alignment with respect to the work surface.

In operation of the apparatus a last is properly secured in the clamp provided for the purpose which in turn is connected to the last supporting means. The position of the last is then adjusted to present the section of the last it is desired to duplicate to the follower point. For example if an outline of the last at its waist portion is to be made the last is gripped at its heel part with its toe portion projecting vertically downward and its angular position so adjusted that the plane in which the waist portion lies will be parallel to the work surface and also positioned vertically at the proper elevation above the work surface to cause the follower point to engage the last at the selected plane. After all adjustments are made and locked against dislodgement the transcribing member is moved by hand over the work surface with the base of the transcribing member firmly engaging the work surface and the follower point held in engagement with the last surface. During the movement of the follower point around the periphery of the last it is desirable also that the follower arm be maintained substantially tangential to the portion of the last over which its point is moving. In this manner the scriber point is caused to trace a perfect outline of the selected last section upon the chart.

To present a better understanding of the invention a specific embodiment thereof will now be described and illustrated in the accompanying drawings in which.

Figure 1:
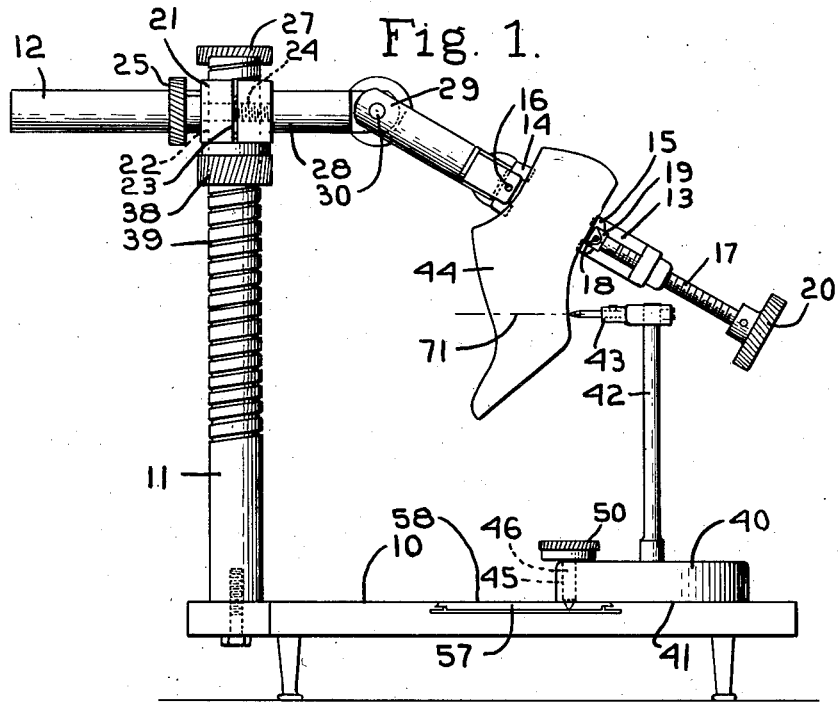
Fig. 1 is a side elevation of the apparatus.

The apparatus is provided with a flat base section the upper face of which is finished accurately flat to present a work surface 10. The base desirably is provided with legs for raising the device slightly above its supporting surface. Desirably three legs are provided to insure that the apparatus will remain in stable position even though it may be placed upon an unsymmetrical supporting surface.

Extending vertically upward from and rigidly secured to the base at a position adjacent the periphery thereof, is a supporting column 11 upon which is adjustably secured a horizontal last supporting arm 12 which extends over the work surface 10. The outer end of the arm 12 has rigidly secured thereto a clamp 13. This clamp desirably is in the form of a C clamp and is provided with a pair of oppositely disposed jaws 14 and 15. These jaws may be of any suitable construction. As herein shown the jaw 14 is provided with a relatively sharp chisel edge for engaging and slightly indenting the wood of the last thereby to obtain a positive grip thereupon. The jaw 14 is pivotally received and closely fitted in a slot in one arm of the C clamp. A pivot pin 16 is provided about which the jaw may rock. This construction permits the chisel edges of the jaw to accommodate themselves to the sloping or curved contours of the last.

The other jaw 15 is mounted upon the end of a clamping screw 17 which has screw threaded engagement with the other arm of the C clamp. The jaw 15 is similar in construction to the jaw 14 and is pivoted at 18 to swing in a slot formed in a swivel block 19 connected to the inner end of the screw 17. Screw 17 is provided with a hand wheel 20 at its outer end by means of which it is tightened against the last. The swivel block 19 permits the screw 17 to be turned while the jaw 15 engages the last.

The arm 12 is so constructed that it will permit a last held in the clamp to be positioned at any elevation desired above the work surface 9 and also over any portion of the area of that surface. Any desirable construction may be utilized to attain this purpose. A suitable arrangement is shown in the drawings in which the end of the arm adjacent the column 11 is composed of a relatively heavy and rigid bar or block 21 having a bore 22 in one end thereof within which the column 11 is received. A slot 23 is cut in the bar 21 severing the outer wall of the bore and permitting the sides of the bore to be contracted to embrace the column 11. To clamp the bar upon the column a clamping screw 24, having a hand wheel 25, is provided. The screw has threaded engagement with that portion of the outer wall of the bore which is remote from the hand wheel 25 and is freely received in the near portion of the wall. Thus when the screw is tightened the bore is contracted about the column rigidly securing the block thereto.

The other end of the block 21 is provided with a horizontally disposed cylindrical bore having its outer wall severed in the same manner as the bore 22. A clamping screw 26 having a hand wheel 27 is received in the end wall of the horizontal bore in the same manner as the screw 24 thereby rigidly to clamp an auxiliary supporting arm 28 therein. The arm 28 is provided with an articulate joint 29 to permit the clamp 13 to be swung into any desired angular position with respect to the bar 21. The joint 29 may be of any suitable construction. As shown in the drawings one section of the arm is bifurcated while the adjacent end of the other section thereof has a tongue formed thereon which is closely received within the bifurcated end of its coacting section. A screw 30 serves as a pivot about which the sections of the arm may swing and also serves as a clamping screw. The screw 30 has threaded connection with the ear 31 of the bifurcated portion of the joint and is provided with a hand wheel 32 which also presents a shoulder for the screw. When the screw is tightened by rotating the hand wheel 32 the elements of the joint become tightly interlocked by reason of the clamping pressure set up by the ears of the bifurcated member of the joint upon the male member of the joint 33. A further adjustment is provided between the arm 28 and the clamp 13. This adjustment permits the clamp to bodily swing about the axis of the arm 28 and be clamped in any position desired. A suitable means for obtaining this adjustment is to reduce the diameter of the outer end of the arm 28 as shown in dotted lines at 34 in Fig. 2, and to form a complementary cylindrical recess 35 in the back portion 36 of the clamp 13. The reduced end of the arm 28 is snugly received in the aperture 35 and the clamp 13 rigidly secured to the arm 28 by means of a set screw 37 threaded in the wall of the recess 35 and engaging at its inner end the reduced portion of the arm 28.

It is obvious that the horizontal arm 12 may be swung completely around the column 11 and also elevated or lowered thereon by loosening the screw 24. In this connection a supporting collar 38 is provided to prevent the sudden lowering of the arm when the screw 24 is loosened. The collar 38 is internally threaded and is received upon complementary threads formed upon the post 11. The chief function of the collar however, is to facilitate the vertical positioning of the clamp 13 and the last held therein. By rotating the collar 38 the block 21 and all of its associated parts are moved along the column 11. The required elevation of the last above the work surface can thus be readily and accurately obtained. The adjusting devices described in connection with the arm 12 together with the ability to swing the arm about the column provide the means for positioning the last over any portion of the area of the work surface 10. The manner of making these adjustments and the facility with which they are made will appear more fully hereinafter.

Means are provided for transcribing the outline of the selected portion of the last upon a chart of paper or other sheet material. The transcribing member is provided with a follower for engaging and moving over the last surface and a scribing member for simultaneously engaging the paper chart. The principle of operation of the transcribing member is based upon the maintenance of accurate perpendicular alignment between the points of contact of the follower and scriber with respect to the work surface.

Any suitable construction may be utilized to effect this principle of operation. A desirable construction is shown in the drawings wherein the transcribing member is provided with a base 40 of considerable bulk and weight. This base member may be any suitable shape. As shown in the drawings it is a round disc having an accurately flat bottom face 41. A vertically disposed post 42 extends upwardly from the base desirably from substantially its central portion. A horizontally extending follower arm 43 is se cured to the upper end of the post 42 and is provided with a pointed outer end for engagement with the last 44. The tip of the pointed end of the arm 43 is situated directly above and in accurate perpendicular alignment with the axis of an aperture 45 formed in the base 40. A scribing tool 46 is accurately fitted in the aperture 45 so that it is free to move vertically therein, but with no side play. The bottom of the tool is finished to a symmetrical cone point with its apex upon the central axis of the tool.

Means may be provided for holding a pencil lead in the scribing tool. This may be done by accurately boring an axial chamber within the tool to receive an adjustable lead carrier 47 within the end of which is formed a friction clutch to receive the inner end of the lead 48. The outer end of the lead is projected through an axial aperture in the lower end of the tool. This aperture must be of a size equal to the diameter of the lead. The lead carrier 47 has screw threaded engagement with the axial chamber of the tool. To feed the lead into proper operating position the carrier is fed downward or retracted by rotating it one way or the other. The projecting portion 49 of the lead should, for accurate results, be shaped into a true cone point. This may be done in any suitable manner such as by using a lead sharpening device which fits over the end of the scribing tool having a knife for engagement with the lead set at the correct angle to produce the desired cone shaped point.

To create the correct pressure upon the scribing point any desirable means may be employed. A suitable means shown herein provides a weight 50 secured to the extended upper end of the scriber 46. This weight exerts a downward pressure of the point upon the chart 51. The size of the weight is regulated to produce the most effective pressure of the point upon the chart.

It will be apparent that the force of gravity acting upon the base 40 of the transcribing member serves to maintain the perpendicular alignment of the point of the follower 43 and the point of the scriber 45 at all times and particularly while it is moved over the work surface in performing the transcribing operation.

Figure 2:
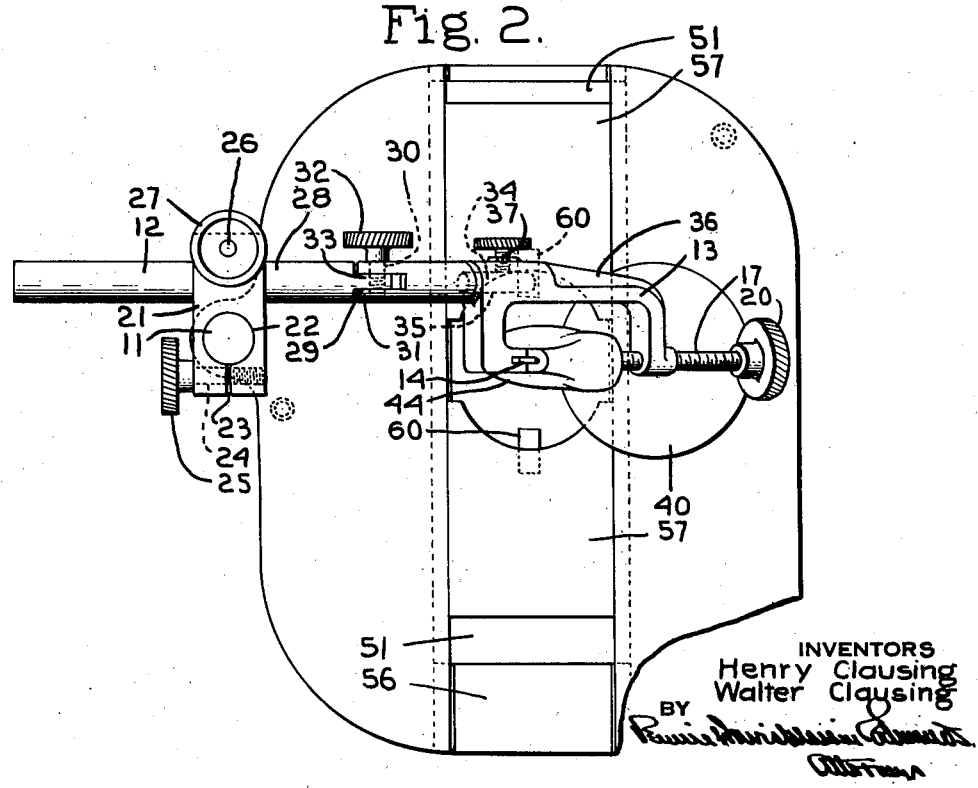
Fig. 2 is a plan view of the device.
Figure 8:
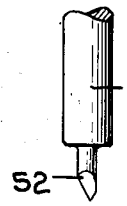
Figs. 8 and 9 are detail views of a form of cutting point which may be used in place of a marking point for outlining the last section.
Figure 9:
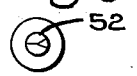

It may be desirable, for certain uses to which the apparatus may be put, to vary the character of the scribing point. The point may be a hardened metallic point which will impress a fine scratch mark upon the chart. The point may also be a narrow sharpened chisel point 52 shown in Figs. 8 and 9. In such case it may be desirable to increase the size of the weight 50 to produce the proper cutting action. In this construction the cutting plane of the chisel point must be held in substantial tangential relation to the surface of the last during the cutting operation. To establish this condition the chisel point must be held constantly at right angles to the follower arm 43 whch itself is held by the operator substantially at right angles to a tangent to the portion of the last surface over which the follower is moving at all times during the transcribing operation. A suitable construction for maintaining the correct position of the chisel point is to provide the weight 50 with a downwardly extending pin 53 the lower end of which is received within and has free vertical movement in an aperture 54 in the base 40. If the chisel point is properly adjusted as above outlined it will be held at all times in substantial parallelism to the direction of its cut. The chisel may not necessarily cut completely through the material out of which the chart is made. However, a partially cut template may very readily and accurately be completed by following the cut made by the chisel point with the point of a knife in the hands of an operator thereby to completely sever the material thus completing the template. In Figs. 1 and 2 of the drawings the position of the last in the apparatus has been adjusted to obtain the cross sectional contour of the last at its waist section. The transcription of the section upon the chart is shown at 55 in Figs. 4 and 5.

The manner in which the chart of paper or other material is held upon the work surface may be arranged to suit a specific set of conditions or may be suited to the form in which the paper material is available either in sheets or in rolls. The simplest method is to use a sheet material of sufficient area to permit the base of the transcriber to ride wholly upon the sheet material surface throughout the transcribing operation. This sheet may be secured upon the work surface with clamps of any suitable construction or by the use of adhesive tape. This method is inclined to be wasteful of sheet material.

Figure 4:
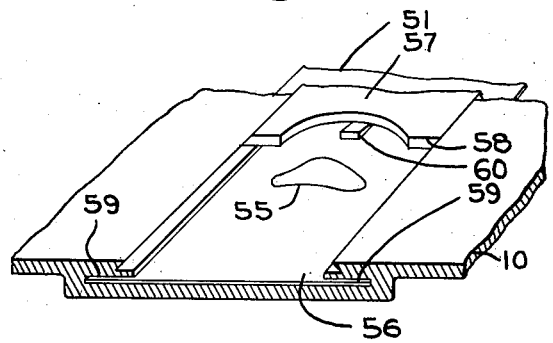
Fig. 4 is a detail view illustrating one means for holding the chart upon which the last sections are transcribed.

One desirable construction for holding the sheet material is illustrated in Fig. 4. In this construction the work surface 9 has a slot 56 formed therein extending transversely across the full width of the base. The slot is of substantially the same width as the strip of sheet material to be used. The material is laid in the slot and partially covered by means of a pair of filler plates 57 fitted in the slot 56. The upper faces 58 of the plates 57 are finished accurately flush with the work surface 10. The filler plates 57 are spaced above the bottom of the slot 56 sufficiently to permit the sheet material to be laid beneath them and are held in place by means of a slide construction such as a dove tail slide. Such a construction permits the plates to move lengthwise in the slot 56. The inner ends of the filler plates desirably are formed in a semi-circular shape as shown in Figs. 2 and 4. If desired, the width of the slot 56 may be increased to accommodate strips of sheet material of various widths. A desirable means for accomplishing this end is to extend the area of the bottom surface of the slot 56 by forming undercuts 59 at the sides of the slot projecting a substantial distance outwardly beyond the dovetail groove.

To use this type of paper holder the position and approximate size of the transcription or template desired to be formed is determined and the filler plates are moved inward or outward sufficiently to embrace a portion of the paper material slightly larger than the outline to be transcribed. The paper is then fastened against movement in any desired manner such as by inserting wedges 60 under the edges of the filler plates or into the slot extensions 58 in such manner that they will engage and secure the paper against slipping within the slot. A minimum quantity of sheet material is used in this type of sheet material holder for each transcription.

In the above described type of paper holder the point 48 of the scriber drops down to the level of the paper surface while the base 40 of the transcribing member rides wholly upon the working surface 10 and the upper faces of the filler plates 57 throughout the transcribing operation. Inasmuch as the scriber is working relatively close to the edges of the filler plates at all times due to the fact that they are adjusted as above set forth relatively close to the outline being transcribed, the greater portion of the area of the base of the transcribing member engages and is firmly supported by the working surface 10 or the surface of the filler plates or both. The vertical stability of the post 42 therefore is maintained throughout the operation of the apparatus.

Figure 5:
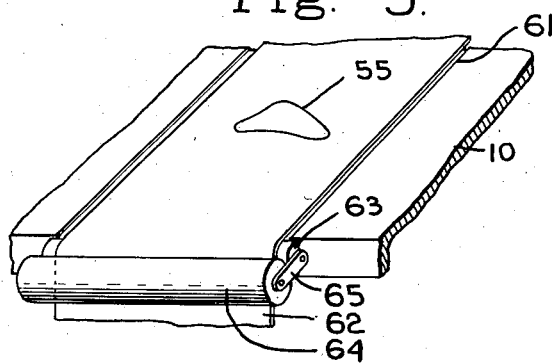
Figs. 5 and 6 are detail views illustrating another form of clamping means to secure the sheet or chart upon which the transcription is made.

Another desirable type of paper holder is illustrated in Fig. 5. In this construction the material is drawn tightly across the work surface and clamped at the sides of the base. If material of substantial thickness is used such as light cardboard it is preferable to cut a recess 61 in the work surface 10. The recess should be the approximate width of the cardboard strip 62, or slightly larger, and of a depth equal to the thickness of the strip. If at any time a matrix of less thickness is used a piece of sheet material may be cemented in position upon the bottom of the groove to adjust the transcribing surface into the exact plane of the work surface 10.

Figure 6:
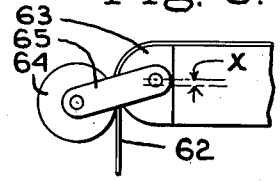
Figure 7:
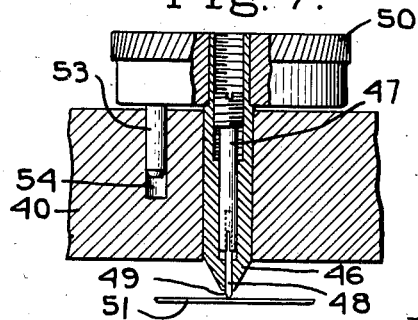
Fig. 7 is a vertical cross sectional view on line 7—7 Fig. 3.

In this form of paper holding device a particularly effective clamping means is employed which is shown in Fig. 5. The paper strip is drawn across the work surface and over semicylindrical jaws 63 secured at opposite sides of the base with their upper periphery tangent to the work surface 10 only one of which is shown in the drawings. Coacting jaws preferably in the form of cylinders 64 engage and cramp the sheet against the jaws 63. The jaws 64 are of considerable weight and are supported by a pair of links 65 situated at the ends of the jaws permitting them freely to swing downward about pivots 66. The links 65 are pivoted upon the ends of the jaws 63 slightly above the axis of the cylindrical surface thereof such as the distance X shown in Fig. 6. The eccentric position of the pivots 66 causes the jaws 64 to bear against the strip 62 with considerable force locking it against movement and due to the downward clinching action of the jaws the strip is firmly stretched across the work surface 10. A convenient manner of operating this strip holding device is to provide a roll of paper or other sheet material of the required width and feed it through the clamping means to present an unused portion as required.

Figure 3:
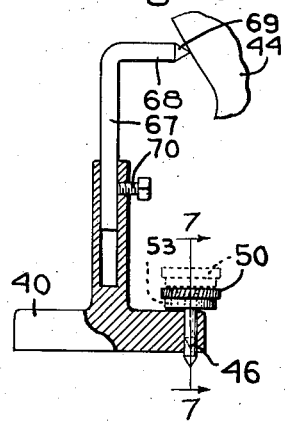
Fig. 3 is a detail view of a modified construction for the transcribing element of the apparatus.

It has been determined by actual use that it is very satisfactory to maintain the height of the follower arm 43 fixed with respect to the work surface. Furthermore such practice is conducive to a high degree of accuracy of operation. In such case the plane upon the last at which the outline is to be made is determined by raising or lowering the arm 12 upon the column 11. However, it may be more convenient for certain operations to provide for adjusting the height of the arm 43. This may be accomplished in any suitable manner. A desirable construction is shown in Fig. 3 in which a post 67 is composed of two sections one telescoping within the other to permit vertical adjustment of the follower arm 68 which presents the pointed end 69 for engagement with the last 44. A set screw 70 is threaded through the wall of the lower portion of the post 67 and engages the upper section of the post to lock them together when the correct height is obtained. Means must be provided in this construction to maintain accurate perpendicular alignment between the follower point 69 and the scriber point. A desirable means to accomplish this end is to construct the shank of the upper portion of the post 64 out of a square bar of metal and accurately fit this bar into a square aperture in the lower portion of the post.

To practice the invention a sheet or strip of sheet material is put in position upon the work surface. A last is then clamped in the clamp 13. Its position in the clamp should be such that the portion of the last containing the section to be outlined is projected downward to permit the transcribing device to be moved completely around the last without obstruction. The various adjustments on the arm 12 and its auxiliary arm 28 are then manipulated to bring the plane 71 of the last which it is desired to outline parallel to and at the proper elevation above the work surface to be engaged by the point of the follower arm 43. The micrometer adjustment afforded by the collar 38 greatly facilitates this adjustment.

The transcribing member is then moved by hand around the periphery of the last with the follower point always in contact therewith and the arm 43 held substantially radially outward from the contour of the last over which the point is moving. During this transcribing motion a light pressure only is maintained between the follower point and the last and care is exercised to insure that the base of the transcribing member remains in firm engagement with the work surface. In this manner a perfect trace of the last contour is made upon the chart as shown in Figs. 4 and 5.

Not only is it possible to produce a true cross-sectional outline of the last at any portion thereof, but also the whole or a portion of the longitudinal sole profile or the profile along the upper portion of the last or at any desired portion of the last may be reproduced. By using the chisel point above described a template may be cut directly from the sheet material thus eliminating the operation of cutting templates by hand after the outline has been traced thereon.

A convenient feature of the invention is found in connection with the pin 53 which moves in the aperture 54 in the base 40. When the transcribing member is not in use the scriber may be lifted upward out of its marking position by lifting the weight 50 until the pin 53 emerges from its aperture and the weight rotated slightly until the end of the pin rests upon the top of the base 40 of the transcribing member as shown in dotted lines in Fig. 3. Thus the point of the scriber is protected and prevented from making a mark until it is desired to resume a transcribing operation at which time the weight is rotated until the pin 53 enters its aperture 54 thereby lowering the scribing point into operating position.

To one skilled in the last making art the importance and highly practical usefulness of this invention is apparent. The reproductions made by the apparatus are perfect and may be used by last makers as master drawings from which new or special types of lasts may be made. The transcriptions may be used as made upon the apparatus or they may be employed as a basic design for a last which it is desired to modify in a known manner.

The transcriptions made upon the apparatus are highly useful for the designing draftsman. Undoubtedly the widest use of the device, however, is in producing templates for use in testing the dimensions and contours of lasts during their process of creation.

In addition to the absolutely reliable precision of operation of the invention its use greatly facilitates and speeds up the special and routine operations performed by the last maker.

Another valuable capability of the invention is its capacity to mark upon the last surface at a selected plane thereof. The last maker or designer frequently desires to mark such a line upon a last to employ as a reference point or line while working upon the last.

Figure 10:
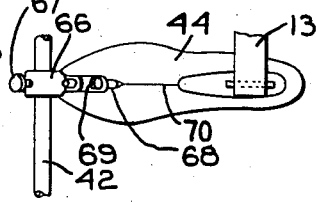
Fig. 10 is an illustration of a particular use of the invention.

A desirable means for accomplishing this end is to provide a marking tool such as the tool 66 shown in Fig. 10 of the drawings. This tool is adjustably secured to the column 42 of the transcribing member and is provided with means for raising or lowering its position upon the column. It is secured in adjusted position by any suitable means such as the thumb screw 67.

The tool extends horizontally outward from the column 42 and has an aperture in its outer end within which is received a pencil 68 or other marking device which is secured within the aperture by means of a screw 69. By moving the transcribing member along the work surface with the point of the pencil engaging the last a line 70 is drawn upon the last surface. As shown in the drawings line 70 is being drawn along the plane of the center of the cone of the last. It is apparent, however, that by using the adjustments provided the last may be positioned to cause the pencil 68 to mark upon any desired portion of the last.

We claim:

1. A fixture for transcribing the outline of a last contour comprising a base presenting a flat work surface having sheet material thereon to receive the transcription, an adjustable last support anchored at the peripheral edge of said base and having an upper structure overhanging the work area for clamping the last in rigid position above said work surface, a transcribing element movable upon said surface, a follower on said transcribing element operable to engage a last held in said last support and be moved along the periphery of the last in a predetermined plane thereof by movement of said transcribing element upon said work surface, a scribing tool on said transcribing element engaging said sheet material to reproduce thereon the outline generated by the path of engagement of said follower with the last and means on said transcribing element for maintaining the point of the follower and the point of the transcriber upon a line perpendicular to said work surface.

2. A fixture for transcribing the outline of a last contour comprising a base having a flat work surface, means on said base for securing sheet material in close contact with said work surface to receive the trace of the last section to be transcribed, a last supporting column secured to said base, a clamp for gripping a last at any portion of its surface, universally adjustable means connecting said clamp and said support column whereby a last in the clamp may be rigidly held in any adjusted position above said work surface, a transcribing member movable upon said work surface and having a relatively heavy base held by gravity in invariable angular relation with respect to said work surface, a follower and a scriber on said transcribing member arranged in perpendicular alignment with respect to said work surface, said follower having a pointed end adapted to engage and trace around the surface of a last held in said clamping means by moving said transcribing member upon said work surface and said scribing member having a point to engage and mark upon said sheet material whereby the outline of a selected portion of the last contour may be transcribed upon the said sheet material.

3. A fixture for transcribing the profile contour of a last comprising a base having a flat work surface, a chart situated upon said work surface for receiving the transcription, a shallow channel in said work surface equal in depth to the thickness of said chart within which the chart is received, means for securing the chart in fixed position upon the work surface in said channel, a support projecting upwardly from said base, universally adjustable clamping means on said support for rigidly holding a last in any desired position above said work surface, a transcribing member movable over said work surface and held in invariable angular relation thereto, a follower on said transcribing member for engaging and tracing around the periphery of a last held in said support, a scribing tool on said transcribing member having a point engaging said chart at a position in perpendicular alignment with respect to said work surface and the point of said follower, whereby the outline of the last contour is transcribed upon said chart by movement of said transcribing member along said work surface with the point of said follower engaging the periphery of the last.

4. A fixture for transcribing the outline of the contours of a last comprising a base presenting a flat work surface, a chart of thin sheet material secured upon said work surface for receiving the transcription, supporting means for rigidly holding a last above said work surface, a transcribing member movable upon said work surface, a follower on said transcribing member operable to engage and be moved over the last surface as the transcribing member is moved, a scriber on said transcribing member engaging and marking the outline of the last upon said chart, a clamping device at opposite sides of said base for securing said chart in fixed position including a pair of cylindrical surfaces between which said sheet material is received one of said surfaces being formed upon a weight pivoted to swing in an arc slightly eccentric to the said other cylindrical surface.

5. A fixture for transcribing the outline of a last contour comprising a base presenting a flat work surface, supporting means secured to said base and acting to rigidly hold a last above said work surface, a transcribing member movable upon said work surface, a follower point and a scriber point situated on said transcribing member in perpendicular alignment with respect to said work surface said follower point operable to engage and be moved over the last surface and said scriber operable to transcribe the last outline, said work surface having a portion of its area adjacent its center disposed below the level of the major portion thereof and means for securing a section of sheet material upon the depressed portion of said work surface to receive the transcription.

6. A fixture for transcribing the outline of a last contour comprising a base presenting a flat work surface upon which is received a chart of sheet material to receive the transcription, supporting means for rigidly holding a last above said work surface, a transcribing member having a flat bottom face of substantial area held in invariable angular relation to said work surface, a follower point and a scriber point situated on said transcribing member in perpendicular alignment to said work surface, said follower and scriber being adapted respectively to engage the last and the chart as the transcribing member is moved to produce the transcription, said work surface having a shallow channel therein the plane of the bottom of which is parallel to said work surface and within which is received said chart, a pair of masking plates slidably mounted in said channel and spaced a short distance above the channel bottom, said plates having their upper faces accurately flush with said work surface and means for securing the chart within the channel, whereby by adjusting the position of the plates to expose only the portion of the sheet to be transscribed upon, the work surface and plates act as a guiding surface upon which the base of the transcribing element moves while the scribing point drops down to and marks upon the chart.

7. A fixture for transcribing the outline of a last contour comprising the elements contained in claim 2 together with means for adjusting the heighth of said follower point with respect to the said work surface.

8. A fixture for transcribing the outline of a last contour comprising a base having a flat work surface, means on said base for securing sheet material in close contact with said work surface to receive the trace of the last section to be transscribed, a last supporting column secured to said base, a clamp for gripping a last at any portion of its surface, a universally adjustable arm connecting said clamp and said support column whereby a last in the clamp may be held in any adjusted position above said work surface, a large nut having screw threaded engagement with said column operable vertically to raise or lower said arm, a transcribing member movable upon said work surface and having a relatively heavy base held by gravity in invariable angular relation with respect to said work surface, a follower and a scriber on said transmitting member arranged in perpendicular alignment with respect to said work surface, said follower having a pointed end adapted to engage and trace around the surface of a last held in said clamping means by moving said transcribing member upon said work surface and said scribing member having a point to engage and mark upon said sheet material whereby the outline of a selected portion of the last contour may be transcribed upon the said sheet material.

9. A fixture for transcribing last contours comprising a base presenting a flat top surface, a transcribing member movable upon and maintained in invariable angular position with respect to said surface and having a scribing arm thereon disposed above the said surface, last holding means secured to said base operable to hold a last in a desired position above said surface and means for adjusting the relative position of the last with respect to the scriber arm, whereby by moving said transcribing member over the flat top of the base with the scriber in engagement with the last, a line may be drawn upon a selected portion of the last which which lies upon a true plane thereof.

HENRY CLAUSING.
WALTER CLAUSING